Nov. 13, 1951  G. S. GREEOTT  2,574,917
BLADE CLOD MASHER

Filed Sept. 14, 1948  2 SHEETS—SHEET 1

Inventor

George S. Greeott

By *Clarence A. O'Brien and Harvey B. Jacobson*
Attorneys

Nov. 13, 1951  G. S. GREEOTT  2,574,917
BLADE CLOD MASHER
Filed Sept. 14, 1948  2 SHEETS—SHEET 2
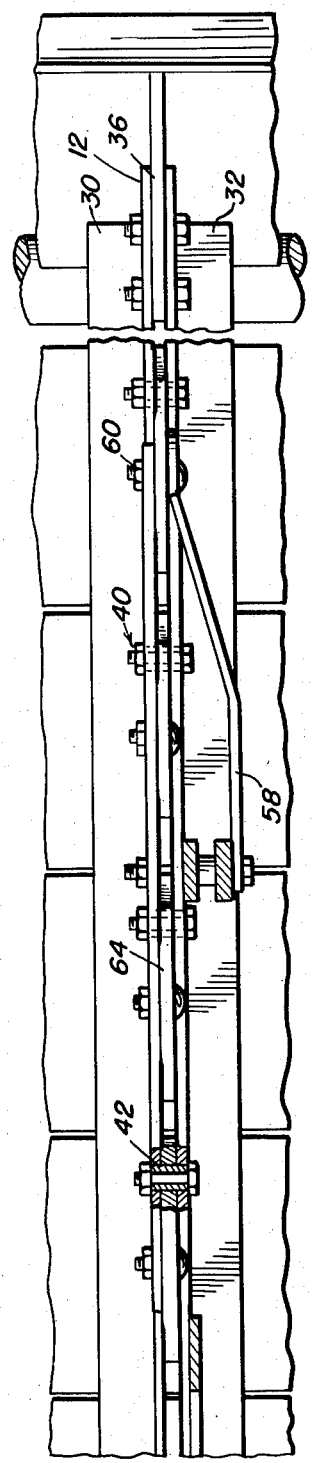
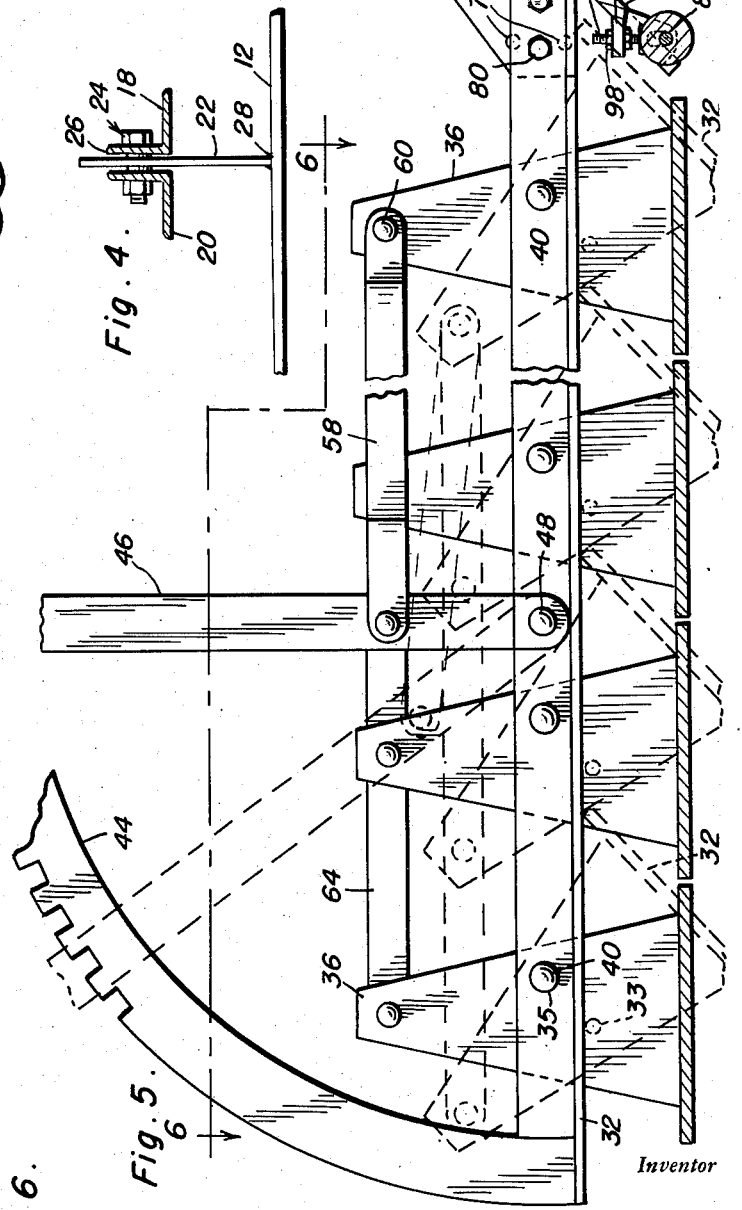
Inventor
George S. Greeott
By *Clarence A. O'Brien
and Harvey B. Jackson*
Attorneys Patented Nov. 13, 1951

2,574,917

UNITED STATES PATENT OFFICE 2,574,917

BLADE CLOD MASHER

George S. Greeott, Healdsburg, Calif.

Application September 14, 1948, Serial No. 49,193

5 Claims. (Cl. 55—22)

This invention relates generally to a soil conditioning device and more particularly to a soil pulverizer or masher, and has for its primary object to reduce clods or lumps left after plowing or harrowing to a fine or pulverized state.

Another important object of this invention is to provide an agricultural implement, which may be easily drafted by a powered unit, and which has a plurality of adjustable members adapted to engage and break up the soil in a uniform manner.

A meritorious feature of this invention resides in the provision of a plurality of assembled blade units, adjustable for positioning in various angles relative to the ground and adapted to be moved over the ground in order to engage or pulverize the lumps or clods therein, means being provided for positioning the blades in the desired angle and maintaining the blades in such position.

These and ancillary objects and other meritorious features are attained by this invention, a preferred embodiment of which is set forth in the following description and illustrated in the accompanying drawings, wherein:

Figure 4 is a sectional view taken substantially on the line 4—4, looking in the direction of the arrows of Figure 1;

Figure 5 is an enlarged sectional view of the center assembly, illustrating the adjusting means provided for positioning the blades in various angles, the view being taken on the line 5—5 of Figure 1;

Figure 6 is a sectional view taken substantially on the line 6—6, looking in the direction of the arrows, and is a top plan view of Figure 5, illustrating the center keeper assembly.

Figure 1:
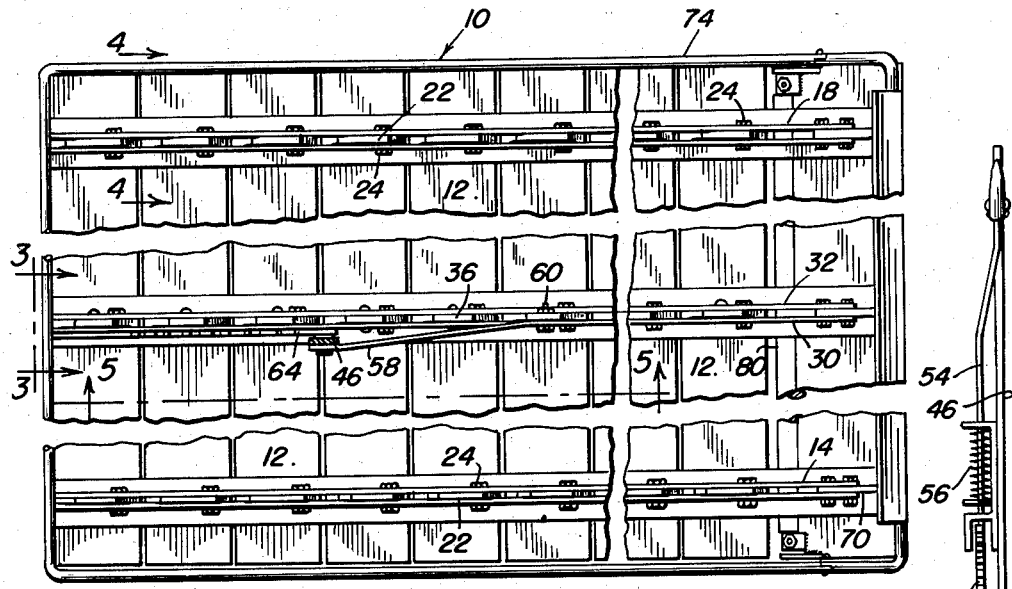
Figure 1 is a top plan view of this invention.

Referring now more particularly to the drawings, wherein similar characters of reference designate corresponding parts throughout, this invention, generally designated by the character reference 10, comprises a plurality of transverse adjustable plates or blades 12, which are pivotally mounted and assembled unitarily, the same being adapted for various angular positionings with respect to the ground.

In carrying out this invention, there is provided a pair of longitudinally extending, cooperatively spaced keepers or angle irons 14 and 16, the same being disposed at one end of the implement 10 with a similar pair 18 and 20 disposed oppositely at the other end. With reference to Figure 4, it is to be noted that the keepers 18 and 20 are adapted to pivotally retain a plurality of end brackets 22, through the medium of a bolt assembly 24. Of course, suitable washers or the like spacing elements 26 are provided to space the keepers from the pivotally retained bracket plates 22. Each blade 12 is welded, as at 28, to the depending end of the retaining bracket plate 22. Interposed and longitudinally extending between the two pair of end keepers are a pair of center keepers 30 and 32. Of course, the blades 12 are welded as at 34 to the depending end of an equal number of center bracket plates 36. The bracket plates 36 are pivotally mounted between the center keepers 32 and 30 and are adapted to be actuated by an actuating unit 38 so as to control the angular positioning of the blades 12, pivotally mounted at each end in the end keepers and pivotally carried by the center keepers.

Figure 2:
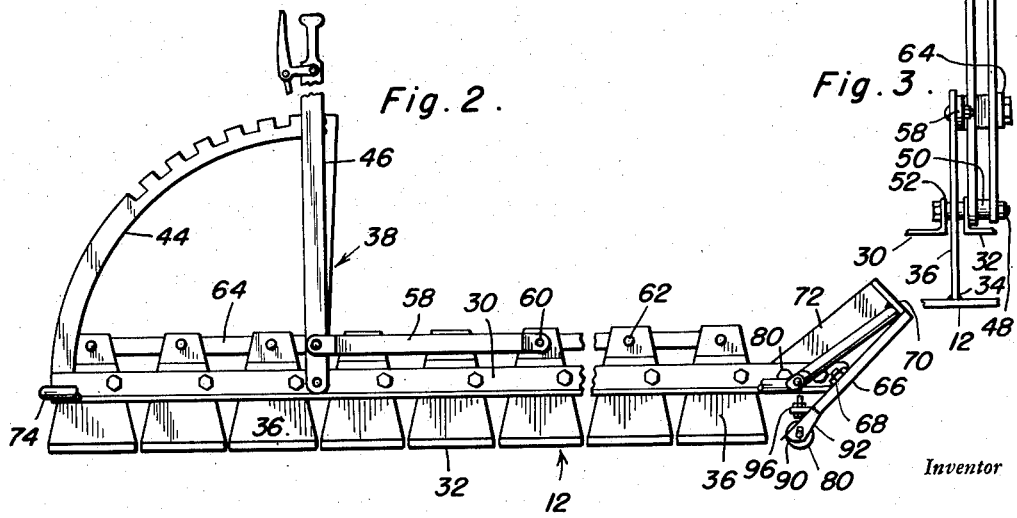
Figure 2 is a side elevational view of the center assembly.

In this respect, particular attention is directed to Figures 2, 5, and 6, wherein it is to be noted that the center retaining brackets 36 carrying the blades 12 at the end thereof are pivotally mounted in the center keepers 32 and 30 through the medium of a bolt assembly 40, having a spacing bushing 42 or the like provided. It is to be noted that each of the end bracket plates 22 and center plates 36 are formed with a pair of longitudinally aligned apertures 33 and 35 which selectively receive the bolt assemblies for pivotally mounting the plates to the respective cooperative keeper bars. The plates as seen in Fig. 5 can thus be reversed to present the front edge of the blades in ground contact when the back edges become worn and, at the same time, the plates will be pivoted adjacent their front edge so that the blades can pivot upwardly in the keepers and the back edges thereof can be disposed in ground engagement.

Figure 3:
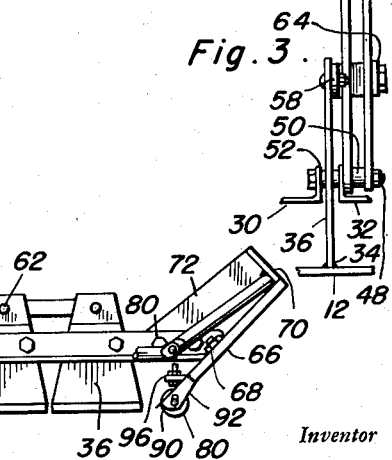
Figure 3 is an end elevational view taken substantially on the line 3—3 of Figure 1 and looking in the direction of the arrows.
Figure 7:
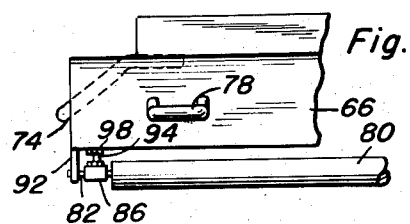
Figure 7 is a fragmentary view of one edge of the frame, illustrating the means provided for drafting the blade assembly over the ground in association with a powered unit.

Welded at one end of the center keepers is a segmental rack 44. A hand lever 46 is pivotally mounted to the center keepers adjacent the forward end of the segmental rack 44, by means of a bolt 48, the bolt 48 securing the pivoted end of the hand lever and the forward end of the rack 44 to the center keepers 32 and 30, with a bushing or like spacing member 50 being interposed between the rack and the lever, as seen in Figure 3. Of course, suitable washers or the like 52 are provided to space the center keepers apart. A pawl 54 is carried pivotally by the hand lever and is resiliently biased by resilient means 56 into released association with the notches in the rack so as to maintain the lever at the desired position. Connected to the hand lever adjacent the pivoted end thereof is an adjuster bar 58, which is bolted by bolt assembly 60 to one of the center bracket plates 36, as seen in Figure 2. Extending longitudinally and connected by a bolt assembly or the like securing means 62 to the upper end of each center bracket plate is a connector bar or rod 64. Thus, movement imparted to the adjuster bar 58 through the medium of the hand lever 46 is transmitted to each of the center brackets from the one connected to the adjuster bar, through the medium of the longitudinally extending connector bar or rod 64.

Secured to the forward end of the pair of end keepers and the interposed center keepers is a lead blade 66, the same being secured by bracing bars 72 and disposed on adjustable angles of attack so as to slant upwardly in front of the adjustable blades 12. A protecting transverse cap bar 70 is welded to the top of the leader blade or plate, as seen in Figure 2. Bracing bars 72 extend from between the pair of end keepers and the center keepers upwardly and are welded or otherwise secured to the bar cap 70 so as to brace the leader plate or blade 66 and maintain the same rigid in its adjustable angular positions. The bracing bars are apertured as at 75 so that the bolt assemblies 80 extending transversely through the ends of the keepers can be selectively positioned in the apertures. Attachment of the bracing bars or brackets 72 in adjusted positions controls the angular positioning of the lead blades, as seen in Figure 2.

If desired and found necessary, due to a wooded area or locale, a suitable tree guard 74 may be provided. The tree guard 74 comprises a rectangular rail, which is supported by the extending end of the end pair of keepers and the center keepers and suitably secured thereto, as by welding or the like. Thus, the bark of the tree is protected from digs by the blades, as the guard rail extends outwardly of the blades and will prohibit the engagement of the blades with trees. The front section 78 of the guard rail has a pair of laterally extending rearwardly directed end extensions 80 which are pivotally associated, as at 82, to the main section of the guard rail as seen in Figure 2, so that the same permits the adjustability of the lead blade.

On each side of the unit, adjacent the forward end thereof, are provided a pair of jaw hooks or links 78 so that the unit may be operatively associated and attached with a powered unit and thereby moved over the ground.

Thus, it can be seen that there is provided a plurality of blades which are pivotally carried by a pair of spaced end keepers and by a similar pair of spaced end keepers, with a pair of center keepers interposed between the two pairs or sets of end keepers and pivotally carry the center portion of the blades, suitable actuating means being provided and carried by the center keepers for adjusting the angle of the blades and maintaining the blades in the set angles. It is to be noted that the entire unit is compact, formed materially and unitarily, and also formed entirely with bolt securing means or the like, so that the same may be easily dismantled.

If desired, due to soil condition or the ground contour, means may be easily attached to the lead blade 66 for enabling the same to move freely and swiftly over the earth. Thus, a roller 80 could be journaled at the lower or ground-contacting edge of the lead blade so that the lead blade will roll over the soil instead of pushing it forwardly. In this respect, attention is directed to Figures 1, 2 and 6, wherein the preferred manner of attaching a roller or series of complementary rollers is illustrated. The roller 80 is provided at its opposite ends 82 and 84 with bearing blocks 86 and 88. The roller 80 is journaled on the lower edge or bottom of the lead blade by means of the bearing blocks 86 and 88. Thus, the ends of the rollers are journaled in brackets 92 welded in a depending manner to the lead blade. Adjusting openings 90 are formed in the brackets 92 to accommodate the ends of the roller. Means is provided for raising and lowering the roller and maintaining the same in the adjusted position within the openings 90 in the brackets. The means preferred comprises a pair of threaded lugs 94 which extend upwardly from the bearing blocks. Apertured ears 96 extend outwardly from the lead blade and adjustably receive the lugs 94, with a pair of complementary locking nuts 98 received above and below the ears and disposed on the lugs. Of course, rectangular openings could be formed lengthwise in the lower edge of the lead blade to accommodate a plurality of spaced complementary rollers journaled in the blade edge in a manner similar to that set forth above.

Since many other purposes and objects of this invention will become apparent to those skilled in the art upon a perusal of the foregoing description, in view of the accompanying drawings, it is to be understood that certain changes may be effected therein and coming within the spirit of the invention and the scope of the appended claims.

Having described the invention, what is claimed as new is:

1. A soil pulverizer comprising sets of elongated parallel bars, a plurality of blades having upper faces transversely carried by the sets of bars, each of said blades having spaced upstanding brackets formed integrally with their upper faces, means for pivotally securing said brackets between each set of bars, and means for simultaneously rocking the blades about their pivot points.

2. A soil pulverizer comprising spaced sets of elongated parallel keeper bars, a plurality of plates having upper faces transversely carried by the sets of bars, each of said blades having spaced upstanding ears formed on their upper faces, pivot elements transversely attached to each set of bars, said ears being pivotally journaled at their forward edges on the pivot elements and means operatively connected to the ears for simultaneously rocking the plates about the pivot elements.

3. The combination of claim 2, wherein the upper portions of said ears project upwardly beyond the bars, said last means being connected to the upper portions.

4. A soil pulverizer comprising a rectangular open frame, transversely spaced sets of keeper bars longitudinally disposed in said frame, a plurality of plates transversely carried by the sets of bars, upstanding ears formed on the plates, fastening bolts securing each set of bars together, said ears being pivotally journaled adjacent their forward edges on the bolts, the upper portions of the ears projecting above the bars, a connecting bar pivotally attached to the upper portions of the ears, a lever pivotally mounted on one of the sets of bars and an actuating bar connected between said lever and one of the ears.

5. The combination of claim 4, wherein a lead blade is adjustably mounted on the front of the frame, said blade having integral flanges pivotally affixed to the sets of keeper bars and means for securing the blade in selective angular relation to the keeper bars.

GEORGE S. GREEOTT.

REFERENCES CITED

The following references are of record in the file of this patent:

UNITED STATES PATENTS

| Number | Name | Date |
|---|---|---|
| 648,146 | Cummings | Apr. 24, 1900 |
| 782,360 | Roth | Feb. 14, 1905 |
| 1,462,120 | Monroe | July 17, 1923 |

FOREIGN PATENTS

| Number | Country | Date |
|---|---|---|
| 107,782 | Sweden | July 4, 1941 |